US006959150B2

(12) United States Patent
Beal et al.

(10) Patent No.: US 6,959,150 B2
(45) Date of Patent: Oct. 25, 2005

(54) OPTICAL METHOD AND SYSTEM FOR MEASURING IN-BAND CROSSTALK IN RAMAN AMPLIFIERS

(75) Inventors: David A Beal, Loveland, CO (US); John Bernard Medberry, Windsor, CO (US); Patricia S Miller, Berthoud, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 329 days.

(21) Appl. No.: 10/328,219

(22) Filed: Dec. 23, 2002

(65) Prior Publication Data

US 2004/0120033 A1    Jun. 24, 2004

(51) Int. Cl.$^7$ ............................................. H04B 17/00
(52) U.S. Cl. ...................................................... 398/37
(58) Field of Search ............................... 398/16, 26, 37

(56) References Cited

U.S. PATENT DOCUMENTS

| | | | | |
|---|---|---|---|---|
| 5,513,029 | A | * | 4/1996 | Roberts ........................ 398/32 |
| 5,521,751 | A | * | 5/1996 | Aida et al. ................... 359/337 |
| 5,812,253 | A | * | 9/1998 | Nishikawa .................. 356/73.1 |
| 6,259,543 | B1 | * | 7/2001 | Golovchenko et al. ....... 398/26 |
| 6,590,644 | B1 | * | 7/2003 | Coin et al. ................... 356/218 |
| 6,885,820 | B2 | * | 4/2005 | Eder et al. ..................... 398/26 |

OTHER PUBLICATIONS

Staubli et al. Power Penalties Due to Multiple Rayleigh Backscattering in Coherent Transmission Systems Using In-Line Optical Amplifiers. IEEE Photonics Technology Letters. vol. 2. No. 12. Dec. 1990. pp. 872-874.*

Lewis, Chernikov, and Taylor, "Characterization of Double Rayleigh Scatter Noise in Raman Amplifiers," IEEE Photonic Technology Letters, vol. 12, No. 5, May 2000, pp. 528-530.

* cited by examiner

*Primary Examiner*—Bernarr E. Gregory
*Assistant Examiner*—Deandra M. Hughes

(57) ABSTRACT

A method for measuring in-band crosstalk in an optical amplifier, such as a Raman amplifier, in which a modulated optical signal is generated using an input modulator. The modulated optical signal is passed through the optical amplifier to obtain a first output optical signal, the power level of which is measured when the input modulator is in its off-state. The modulated optical signal is then attenuated by a factor equal to the extinction ratio of the input modulator to obtain an attenuated modulated optical signal which is passed through the optical amplifier to obtain a second output optical signal. The power level of the second output optical signal is measured when the input modulator is in its on-state. The in-band crosstalk is calculated by subtracting the power level of the second output optical signal from the power level of the first output optical signal.

22 Claims, 4 Drawing Sheets

OPTICAL METHOD AND SYSTEM FOR MEASURING IN-BAND CROSSTALK IN RAMAN AMPLIFIERS

FIELD OF THE INVENTION

The invention relates to the testing of optical amplifiers. In particular, the invention relates to a method and system for measuring In-band Crosstalk (IBX) in a Raman Amplifier.

BACKGROUND OF THE INVENTION

Fiber optic communication systems use glass fibers as optical waveguides. Information is encoded into a modulated light signal that is propagated along the fibers. Propagation losses in the optical fibers necessitate the use of amplifiers if long distance communication is required. Originally, the optical signal was amplified by converting it to an electrical signal, amplifying it and then converting it back to an optical signal. More recently, erbium-doped fiber amplifiers (EDFAs) have been used. EDFAs are all-optical amplifiers, but have limited bandwidths, high noise levels and require a special type of fiber. Raman amplifiers are an alternative to EDFAs that address all of these problems. They provide a large gain over a wide bandwidth while maintaining small noise figures, and they can be made using standard silica fibers.

Raman amplification occurs when lightwaves from a high energy "pump" laser interact with the crystalline lattice of the optical fiber. The atom absorbs the light, then re-emits a photon with energy equal to the original photon plus or minus the atomic vibration. If the excitation occurs simultaneously with the interaction of another "communication" photon within the proper frequency range, an identical "twin" photon will be emitted in phase with the communication photon. The waves of potential energy created by the absorption of the pump photons are called Phonons. Silica glass fibers support a wide range of phonon frequencies, which allows for a very wide Raman gain bandwidth.

In a Raman amplifier, a high-power pump beam is propagated down a fiber simultaneously with the signal. The pump-beam is absorbed in the silica fibers in a virtual reservoir of signal energy, in the form of acoustic phonons. Since the signal and the pump propagate in the same fiber, the signal acts to stimulate emission of photons with the same modulation and frequency as itself.

One problem with Raman amplifiers is the potential for noise introduced by double Rayleigh backscatter. Rayleigh scattering is caused by refractive index inhomogeneities in the fiber that are small compared to the wavelength. It has been shown that the double Rayleigh backscatter (DRB) is the same spectral frequency as the primary signal and hence it is also referred to In-band Crosstalk (IBX). IBX is indistinguishable from the signal in the wavelength (frequency) domain, because it consists of signal photons that have been multiply-delayed before reaching the receiver, resulting in background noise in the time domain, rather than the wavelength domain. For most optical amplifiers the effect of double Rayleigh backscatter is negligible. However, in a Raman amplifier, the amplification is distributed and takes place over a significant length of fiber. Hence, there is an increased possibility of double Rayleigh backscatter. Additionally, since the amplification medium is also the scattering medium, the double Rayleigh backscatter is amplified on each journey through the amplifier, while the signal only benefits from a single journey.

Double Rayleigh backscatter is very difficult to measure using optical instrumentation and continuous source test methods, such as the Interpolation with Source Subtraction (ISS) method.

A prior attempt to measure double Rayleigh backscatter is described in 'Characterization of Double Rayleigh Scatter Noise in Raman Amplifiers', Lewis, Chermikov and Taylor, IEE Photonic Technology Letters, Vol. 12, No. 5, May 2000. Lewis et al., use a signal modulated through a high-extinction ratio Acousto-Optic Modulator (AOM) on the amplifier input. The modulation rate is assumed to be high enough to avoid modulation of the double backscattered signal at the receiver end. At the output, a second Acousto-Optic Modulator runs 180° out-of-phase with the input AOM. The output from the second AOM is collected by an optical spectrum analyzer. The amplified spontaneous emission (ASE) is measured using interpolated measurements from either side of the signal band, and the combination of ASE and double backscatter are measured in band. The difference between the two measured quantities yields the double backscatter. This method requires complete source signal extinction to work accurately.

The use of out-of-phase AOMs is designed to extinguish the source signal and leave the noise on the output. However, it is difficult to completely extinguish the signal (source or output), particularly when the amplifier gain is high. This is a problem, for example, in a research and development environment, where a wide variety of amplifier types and properties are used.

SUMMARY OF THE INVENTION

The present invention provides a method and system for measuring in-band crosstalk in an optical amplifier. An input modulator is used to generate a modulated optical signal and the extinction ratio of the input modulator is measured. The modulated optical signal is then passed through the optical amplifier to obtain a first output optical signal and the power level of the first output optical signal is measured when the input modulator is in the off-state. The modulated optical signal is then attenuated by a factor equal to the extinction ratio of the input modulator and the resulting attenuated modulated optical signal is passed through the optical amplifier to obtain a second output optical signal. The power level of the second output optical signal is measured when the input modulator is in the on-state. Finally, the in-band crosstalk is calculated by subtracting the power level of the second output optical signal from the power level of the first output optical signal.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

Figure 1:
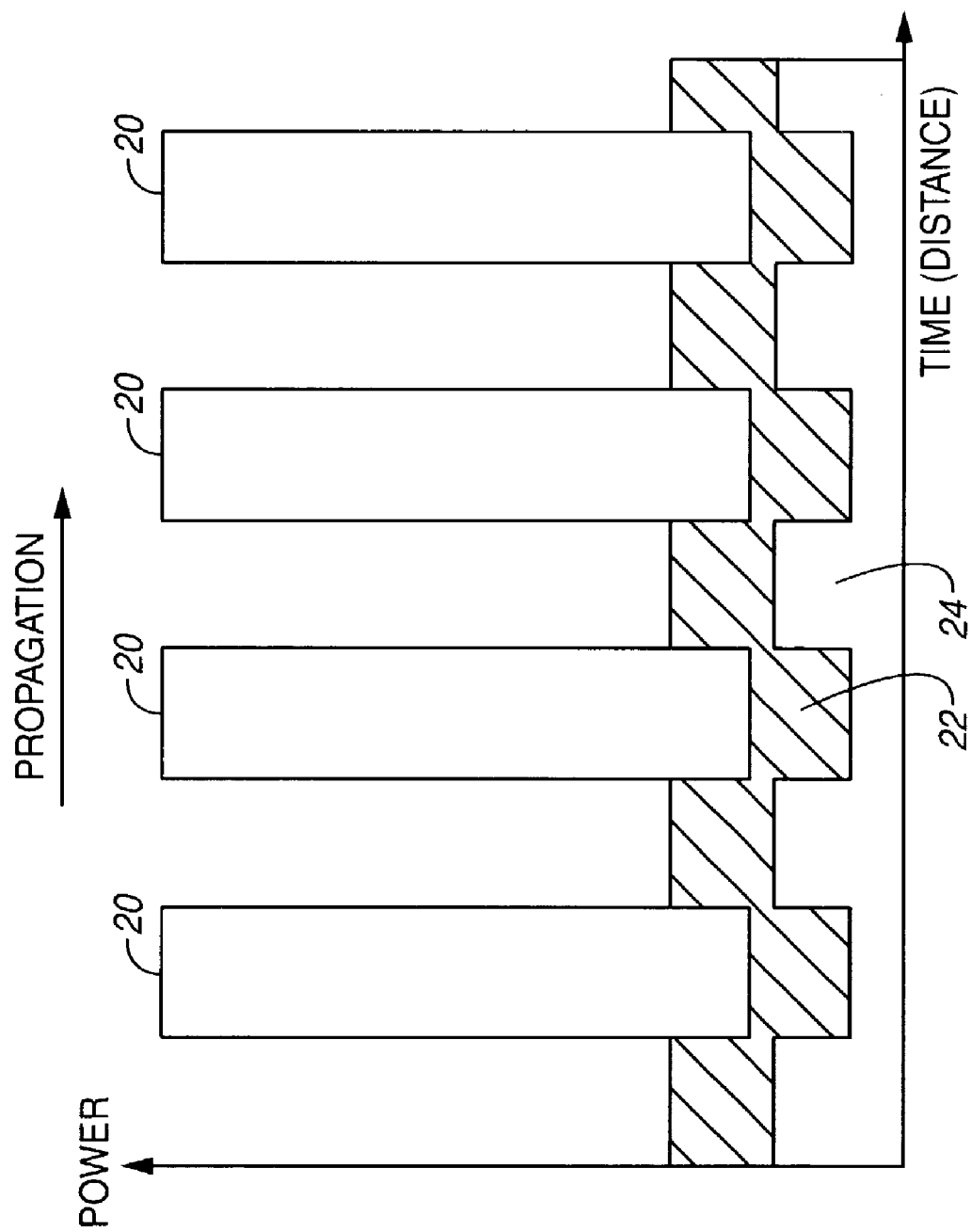
FIG. 1 is a graph depicting the power in a fiber as a function of time or distance.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

The present invention provides a method and system for measuring In-band Crosstalk in a Raman amplifier. In particular, it provides for an error correction when the extinguishing of the source signal is incomplete. It further allows measurement of the In-band Crosstalk in the presence of unsaturated amplifier spontaneous emission.

"Saturated" amplified spontaneous emission (ASE) in a Raman amplifier can be measured using the Interpolation with Source Subtraction (ISS) method. The method of the present invention allows the In-band Crosstalk to be measured in the presence of "unsaturated" ASE, that is, ASE when the signal is not high enough to saturate the amplifier. Since ASE relaxation rates are considered virtually instantaneous, as well as quite fluid even under normal signal input conditions, direct measurement of actual ASE with the amplifier in a saturated state is impossible using standard Time Domain Extinction (TDE) without interpolation offsets. However, the method of the present invention allows unsaturated ASE at specified low signal strengths to be measured at the same modulation rates as TDE without full input signal excitation. In addition, the combination of ASE and In-band Crosstalk can be measured using a modified TDE method.

FIG. 1 is a graph depicting the optical power in a fiber as a function of time or distance. The fiber is excited by a modulated signal that produces power pulses 20. Also present is double Rayleigh backscatter noise 22 and amplified spontaneous emission (ASE) noise 24. Note that the ASE is reduced when the signal is present, since some if the residual energy of the pump laser is used to amplify the signal, as opposed to generating ASE. The power of the ASE 24, assuming constant pump power, depends upon the signal power; hence the ASE is modulated by the signal 20, being lower when the signal pulse is present. The relaxation or decay time of the ASE in a Raman amplifier is very short and can be neglected. The modulation rate of the double Rayleigh backscatter (DRB), though, is identical to that of the signal, with amplitude varying with the mitigating factors of fiber length and numbers of pulses spread throughout the span. If the modulation rate is high enough for the fiber length, the modulation amplitude of the DRB can be neglected, such that it may be considered constant. For example, a modulation rate that produces at least 25 cycles within one round trip of the fiber span is sufficient to maintain a substantially constant level of DRB. This is not dependent on modulation rate alone, but also on fiber length, such that the modulation period of the test is very short compared to the flight time through the fiber span. For a 20 km fiber span, a modulation rate of only 125 kHz is sufficient for this condition.

Figure 2:
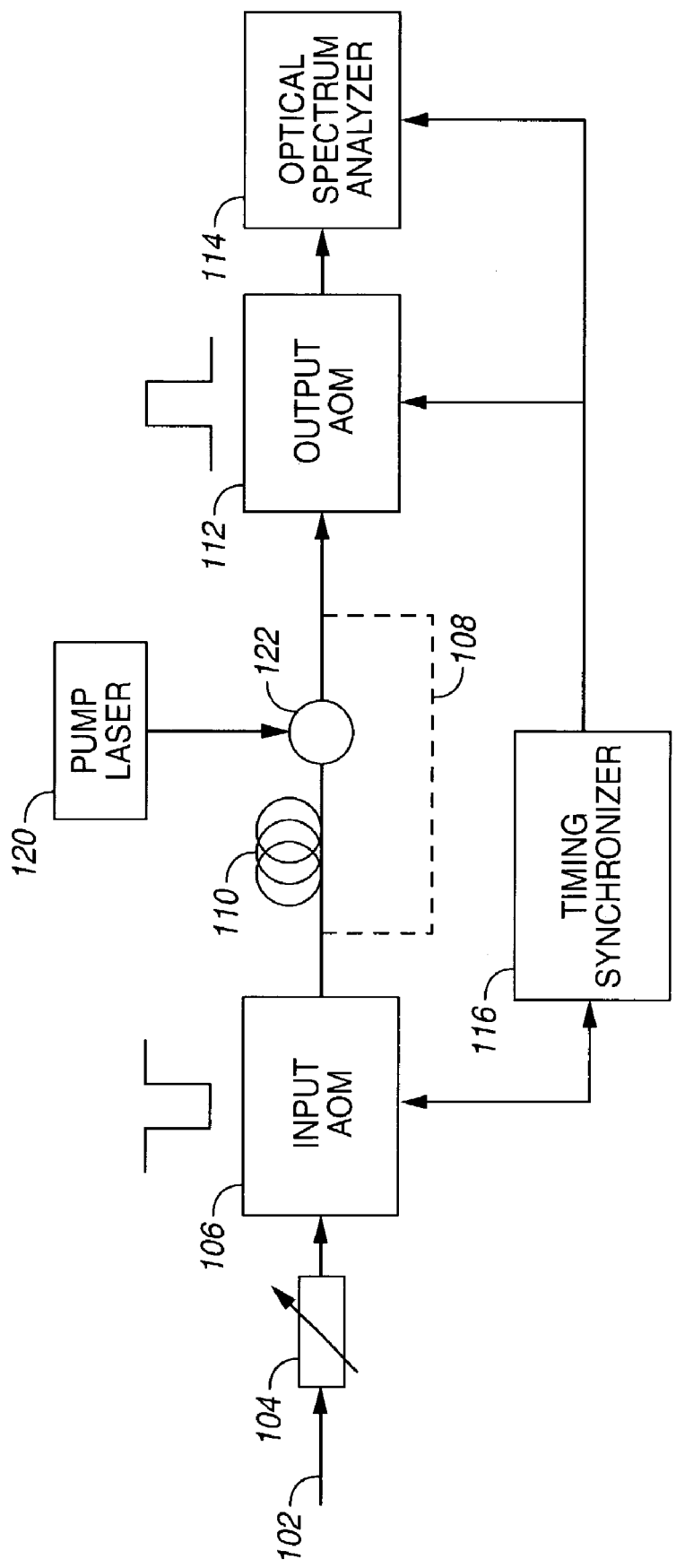
FIG. 2 is a diagrammatic representation of a system for performing first and second measurements of a Raman amplifier.
Figure 3:
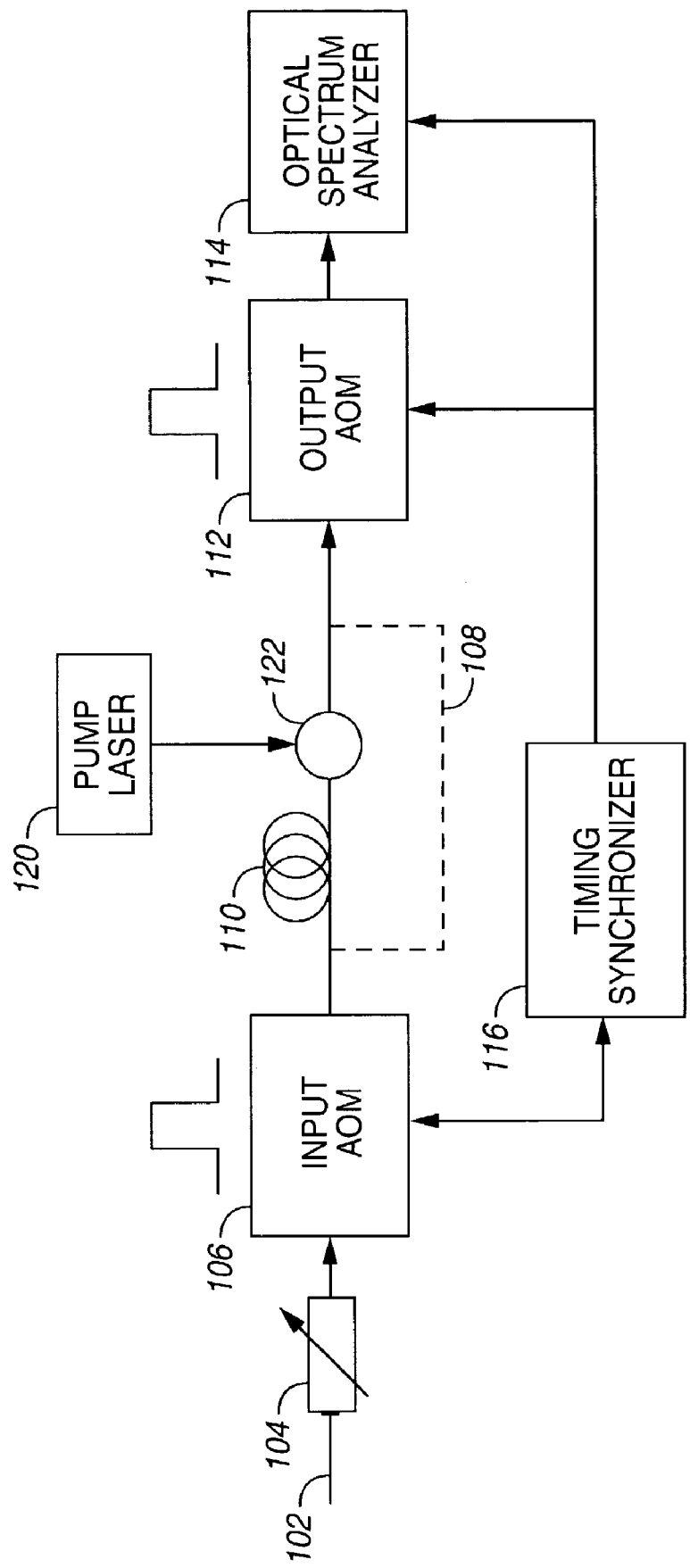
FIG. 3 is a diagrammatic representation of a system for performing a third measurement of a Raman amplifier.

One embodiment of an optical test system for measuring In-band Crosstalk is shown in FIG. 2. An input light beam is passed along fiber 102 to a variable attenuator 104 and then to an input acousto-optic modulator (AOM) 106. The transparent material in the AOM is excited by an acoustic wave (from a piezoelectric transducer for example), which causes a periodic fluctuation in the refractive index of the material. This periodic fluctuation diffracts the input light beam. High frequency RF drivers are used to control the AOMs and modulate the optical signal passing through them. The output from the acousto-optic modulator (AOM) 106 is a modulated lightwave that is passed either to a reference path 108 or to the device under test 110. The reference path consists of a short fiber that bypasses the device under test. A pump laser 120 is coupled via an optical coupler 122 to the device under test 110. The signal from the pump laser propagates in the opposite direction to the test signal or communication signal. In an alternate embodiment, the pump laser is coupled to the other end of the device under test, so that the pump laser signal propagates in the same direction as the test signal. The output lightwave from the reference path or the device under test is passed through the optical coupler 122 and then to an output acousto-optic modulator 112 and then to an optical spectrum analyzer 114. For the first and second measurements, described-in detail below, the output acousto-optic modulator 112 is configured to be out-of-phase with the input acousto-optic modulator 106. This substantially blocks the modulated signal (20 in FIG. 1) and passes only the ASE and the In-band Crosstalk. In Dense Wavelength Division Multiplexing (DWDM) each of the 40 or more signal channels occupies a specific frequency or wavelength band. Typically, these bands occupy the spectrum between 1.52 $\mu$m and 1.57 $\mu$m (196–191 THz), with about 100 GHz ($8\times10^{-4}$ $\mu$m) channel spacing during test. The optical spectrum analyzer is triggered by the modulation signal to measure each channel wavelength when the input acousto-optic modulator is in the "off" state. For the third measurement, described below, the output acousto-optic modulator 112 is configured to be in-phase with the input acousto-optic modulator 106. The phase (timing) relationship between the input and output AOMs and the optical spectrum analyzer is maintained by use of a timing synchronizer 116, which may be incorporated into one of the AOMs or the optical spectrum analyzer. This configuration is shown in FIG. 3. In this configuration, the optical spectrum analyzer is triggered by the modulation signal to measure each channel wavelength when the input acousto-optic modulator is in the "on" state.

In one embodiment of the present invention, the In-band Crosstalk is determined from three measurements.

For the first measurement, the level of an input optical signal is set using a variable attenuator (104 in FIG. 2), the signal is then passed through an input acousto-optical modulator (106 in FIG. 2) and through a reference path (108 in FIG. 2). The output signal is passed through an output acousto-optical modulator (112 in FIGS. 2 and 3 for "off" state and "on" state, respectively) and measured by an optical signal analyzer (114 in FIGS. 2 and 3). The optical signal analyzer is triggered to measure each channel wavelength when the input AOM is in the "off" state, as well as in the "on" state, by using the test system configuration depicted in FIG. 3, with the output AOM (112 in FIG. 3) in-phase with the input AOM. The extinction ratio of the input AOM is then calculated (using a measurement of the system in the "on" state and the "off" state). The extinction ratio is the ratio of the signal level when the input AOM is in the "on" state to when it is in the "off" state.

For the second measurement, the signal is passed through the device under test (the Raman amplifier) (110 in FIG. 2). The optical spectrum analyzer is used to measure the optical power P1 between the signal pulses, which is the sum of the unsaturated amplified spontaneous emission (ASE) and the In-band Crosstalk (IBX), i.e. P1=ASE+IBX(S1), where S1 is the signal level.

For the third measurement, the variable attenuator is increased by the extinction ratio $r_e$ of the input AOM and the signal, with level $S2=S1/r_e$, is again passed through the device under test. For this measurement, the output AOM is set to be in-phase with the input AOM and the optical signal analyzer is configured to measure during the "on" state of the input AOM (FIG. 3). If the extinction ratio of the input AOM is high, the signal level for this third measurement will be small and can be neglected. For example, if the extinction ratio is 30 dB, the IBX in the third measurement is reduced by 30 dB and may be neglected. This provides a signal-corrected level of the unsaturated ASE, P2. More precisely, $$P2=ASE+IBX(S2)=ASE+IBX(S1/r_e),$$

where $r_e$ is the extinction ratio.

When $r_e$ is large, P2≅ASE and the In-band Crosstalk may be calculated from P1 and P2 as $$IBX \cong P1-P2.$$

Referring to FIG. 1, note that P1 is the measurement of the "off" states of the high input (low attenuation) modulated signals on the output of the amplifier. P2 is the measurement of the "on" states of the low input (high attenuation) modulated signals on the output of the amplifier, which will be made in absence of DRB, because the primary signal is almost completely extinguished at this phase of measurement. The In-band Crosstalk can then be used to calculate the noise factor and noise figure due to MPI at any selected source line-width and/or modulation rate.

Figure 4:
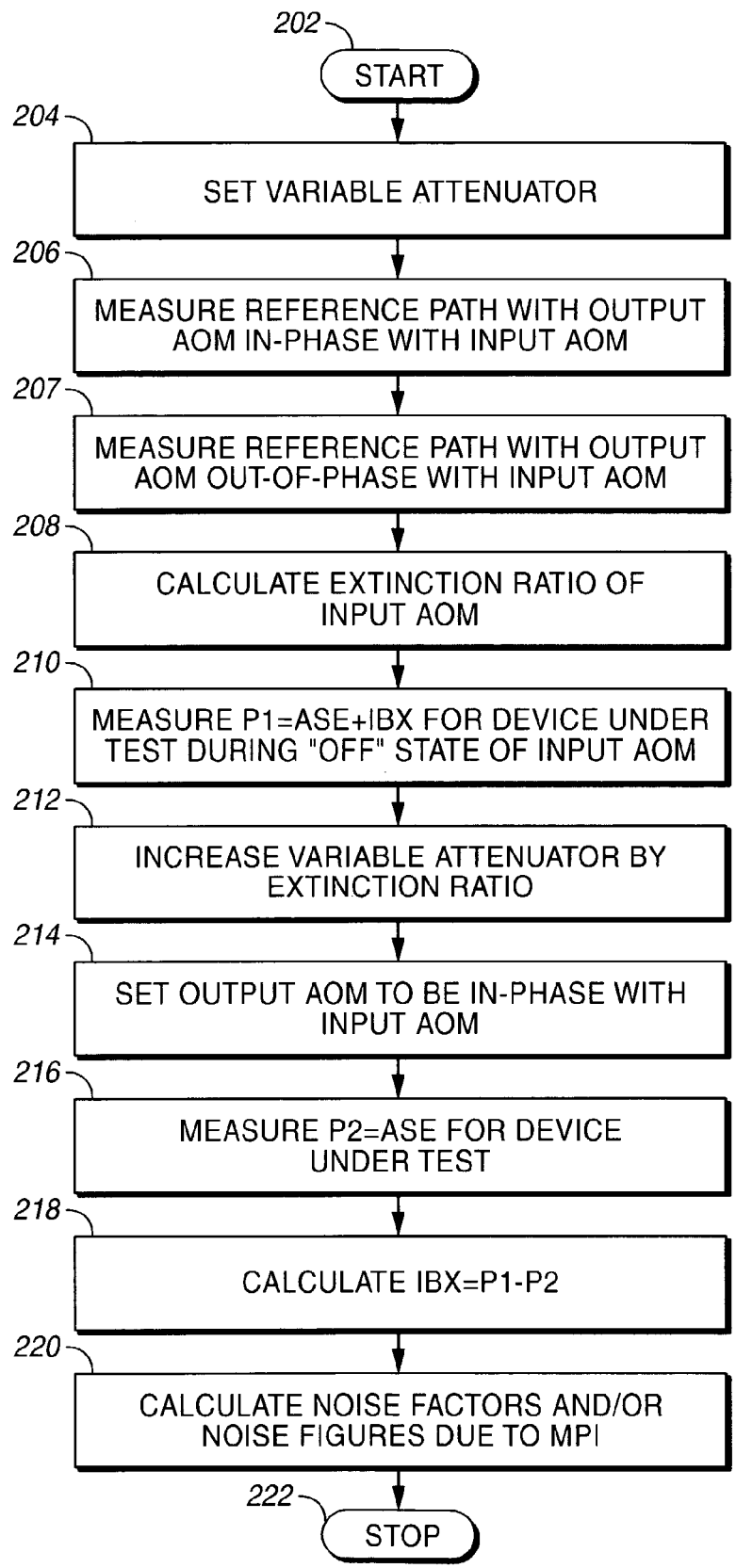
FIG. 4 is a flow chart depicting an embodiment of the method of the present invention.

The method is summarized in the flow chart of FIG. 4. Following start block 202, the level of the variable attenuator is set at block 204. The attenuator may be placed before or after the input AOM. At block 206, the reference path is measured with the output AOM in-phase with the input AOM, then, at block 207, with the output AOM out-of-phase with the input AOM. This enables the extinction ratio of the input AOM to be calculated at block 208. The signal is then passed through the device under test and the optical power P1=ASE+IBX is measured at block 210 during the "off" state of the input AOM. At block 212, the variable attenuator is increased by the measured extinction ratio. The output AOM is configured to be in-phase with the input AOM at block 214 and then the device under test is measured again at block 216 to determine the signal-corrected ASE. This measurement is made during the "on" state of the input AOM. At block 218, The In-band Crosstalk (IBX) is calculated as IBX=P1–P2. Finally, at block 220, the In-band Crosstalk may be used to calculate the noise factor and noise figure due to MPI at any selected source line-width and/or modulation rate. The process terminates at block 222.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for measuring in-band crosstalk in an optical amplifier, the method comprising:
    generating a modulated optical signal using an input modulator, the input modulator having an off-state and an on-state;
    measuring the extinction ratio of the input modulator;
    passing the modulated optical signal through the optical amplifier to obtain a first output optical signal;
    measuring a power level of the first output optical signal when the input modulator is in the off-state;
    attenuating the modulated optical signal by a factor equal to the extinction ratio of the input modulator to obtain an attenuated modulated optical signal;
    passing the attenuated modulated optical signal through the optical amplifier to obtain a second output optical signal;
    measuring a power level of the second output optical signal when the input modulator is in the on-state; and
    calculating the in-band crosstalk by subtracting the power level of the second output optical signal from the power level of the first output optical signal.

2. A method in accordance with claim 1, wherein the input modulator is an acousto-optic modulator.

3. A method in accordance with claim 1, wherein measuring the extinction ratio comprises:
    passing the modulated optical signal through a reference path and an output modulator;
    measuring a first power level of the output modulator using an optical signal analyzer when the input and output modulators are out-of-phase with each other, and
    measuring a second power level of the output modulator using the optical signal analyzer when the input and output modulators are in-phase with each other.

4. A method in accordance with claim 1, wherein measuring a power level of the first output optical signal comprises:
    passing the first output optical signal through an output modulator; and
    measuring the power level of the output modulator using an optical signal analyzer.

5. A method in accordance with claim 4, wherein the input and output modulators are out-of-phase with each other.

6. A method in accordance with claim 1, wherein measuring a power level of the second output optical signal comprises:
    passing the second output optical signal through an output modulator; and
    measuring the power level of the output modulator using an optical signal analyzer.

7. A method in accordance with claim 6, wherein the input and output modulators are in-phase with each other.

8. A method in accordance with claim 1, wherein the modulation rate of the input modulator is high enough that modulation of the in-band crosstalk is negligible.

9. A method in accordance with claim 8, wherein optical amplifier includes a fiber span and wherein the modulation period of the input modulator is short compared to the flight time through the fiber span.

10. A method in accordance with claim 8, wherein optical amplifier includes a fiber amplifier medium and wherein the input modulator produces at least 25 cycles within the time taken for a signal to propagate from one end of the fiber amplifier medium to the other end and back again.

11. A method in accordance with claim 1, wherein the optical amplifier is a Raman amplifier.

12. A method in accordance with claim 1, further comprising calculating the noise factor of the optical amplifier from the in-band crosstalk.

13. A method in accordance with claim 1, further comprising calculating the noise figure of the optical amplifier from the in-band crosstalk.

14. A method in accordance with claim 1, wherein the power level of the first output optical signal and the power level of the second output optical signal are measured for one or more of a plurality of wavelength channels.

15. A method in accordance with claim 1, wherein the input modulator provides incomplete extinction.

16. A method in accordance with claim 1, further comprising:
   passing a light beam through a variable attenuator to produce an attenuated light beam; and
   passing the attenuated light beam through an acousto-optic modulator to produce the modulated optical signal.

17. A system for measuring in-band crosstalk in an optical device under test, the system comprising:
   an input optical modulator for generating a modulated optical signal, the input optical modulator having an off-state and an on-state;
   a variable attenuator, optically coupled to the input optical modulator;
   a first optical coupler operable to couple the modulated signal optically to the device under test;
   an output optical modulator;
   a second optical coupler operable to couple the device under test optically to the output optical modulator;
   an optical spectrum analyzer, optically coupled to the output optical modulator; and
   a timing synchronizer, coupled to the input and output optical modulators and the optical spectrum analyzer, the timing synchronizer being operable in a first mode to control the optical spectrum analyzer to measure an output of the device under test when the input modulator is in the off-state and in a second mode to control the optical spectrum analyzer to measure an output of the device under test when the input modulator is in the on-state,
wherein the variable attenuated is operable to attenuate the modulated optical signal by a factor equal to the extinction ratio of the input optical modulator when the timing synchronizer is operated in the second mode.

18. A system in accordance with claim 17, wherein the device under test is a reference optical path.

19. A system in accordance with claim 17, wherein the device under test comprises an optical amplifier.

20. A system in accordance with claim 19, wherein the optical amplifier is a Raman amplifier.

21. A system in accordance with claim 19, wherein the optical amplifier comprises a pump laser and an optical fiber span.

22. A system in accordance with claim 17, wherein the input and output optical modulators are acousto-optic modulators.

* * * * *